(12) United States Patent
Bowen et al.

(10) Patent No.: US 6,358,177 B1
(45) Date of Patent: Mar. 19, 2002

(54) POWER TRANSFER ASSEMBLY EQUIPPED WITH A COPLANAR GEAR ASSEMBLY

(75) Inventors: Thomas C. Bowen, Rochester Hills; Alexander R. Mangani, Warren; Philip J. Francis, Lapeer, all of MI (US); Randolph C. Williams, Weedsport, NY (US)

(73) Assignee: New Venture Gear, Inc., Troy, MI (US)

( * ) Notice: Subject to any disclaimer, the term of this patent is extended or adjusted under 35 U.S.C. 154(b) by 0 days.

(21) Appl. No.: 09/612,642

(22) Filed: Jul. 7, 2000

Related U.S. Application Data

(60) Provisional application No. 60/142,719, filed on Jul. 7, 1999.

(51) Int. Cl.[7] .................................................. F16H 1/36
(52) U.S. Cl. ...................................... 475/177; 475/174
(58) Field of Search ................................ 475/174, 176, 475/177

(56) References Cited

U.S. PATENT DOCUMENTS

| | | | | |
|---|---|---|---|---|
| 1,634,091 A | * | 6/1927 | Bethune et al. | 475/177 X |
| 1,740,010 A | * | 12/1929 | Engelhardt | 475/177 X |
| 1,885,156 A | * | 11/1932 | Thomas et al. | 475/177 X |
| 1,950,580 A | * | 3/1934 | Thomas | 475/177 X |
| 2,005,167 A | * | 6/1935 | Roeder | 475/173 X |
| 2,322,394 A | * | 6/1943 | Sharpe | 475/174 X |
| 4,825,726 A | * | 5/1989 | Schofield | 475/174 |

FOREIGN PATENT DOCUMENTS

FR 579067 * 10/1924 ................ 475/177

* cited by examiner

*Primary Examiner*—Charles A Marmor
*Assistant Examiner*—Ha Ho
(74) *Attorney, Agent, or Firm*—Harness, Dickey & Pierce P.L.C.

(57) ABSTRACT

A power transfer assembly is provided with a coplanar gear assembly. The coplanar gear assembly can be utilized in a differential, a multi-speed transmission, a four-wheel drive transfer case, and a fluid pump.

2 Claims, 4 Drawing Sheets

POWER TRANSFER ASSEMBLY EQUIPPED WITH A COPLANAR GEAR ASSEMBLY

This application claims the benefit of provisional application Serial No. 60/142,719, filed Jul. 7, 1999.

BACKGROUND OF THE INVENTION

The present invention relates in general to power transfer assemblies. More particularly, the present invention relates to a power transfer assembly equipped with a coplanar gear assembly.

Due to increasing consumer demand for front wheel drive vehicles with more powerful yet fuel-efficient drivetrains, the engine and transaxle must be efficiently packaged to take advantage of all available space within the engine compartment. Concomitantly, most modern transaxles must be capable of providing at least forward five speed ratios. As such, minimizing the overall size of the transaxle is of critical importance to the transmission designer. To meet these requirements, various "three-shaft" type transaxles have been developed. For example, U.S. Pat. No. 4,738,150 discloses a five-speed manual transaxle having an input shaft and a pair of countershafts both of which drive a differential which, in turn, drives a pair of axle half-shafts. Gearsets on both counter-shafts can be selectively engaged to deliver power from the input shaft to the axle half-shafts. Furthermore, U.S. Pat. Nos. 5,385,065 and 5,495,775 disclose five-speed transaxles having a synchronized reverse gear arrangement.

Accordingly, while such conventional manual transaxle designs attempt to address the packaging requirements mentioned above, a need still exists for development of more compact and robust manual transaxles that can meet the demands of modern front wheel drive vehicular applications.

SUMMARY OF THE INVENTION

The primary object of the present invention is to provide a multi-speed manual transaxle that meets the above-noted needs and improves upon conventional designs.

Accordingly, the present invention is directed to a differential gear mechanism which can be used in a transaxle and is driven by a pinion gear and operable to permit relative rotation between a first axle shaft and a second axle shaft, the differential gear mechanism including a sun gear adapted to be splined for rotation with the first axle shaft. An annulus/ring gear including external teeth is adapted to meshingly engage teeth of the pinion gear. A cluster gear including external teeth is in meshing engagement with internal teeth of the annulus/ring gear and has internal teeth in meshing engagement with said sun gear. A carrier supports the cluster gear and is adapted to be splined for rotation with the second axle shaft.

The present invention is also directed to a transmission device comprising an input shaft; a coplanar gear arrangement having a plurality of components including a sun gear in meshing engagement with a cluster gear, said cluster gear being supported by a carrier and including internal teeth in engagement with said sun gear, and an annulus gear including internal teeth in engagement with external teeth of said cluster gear, said input shaft being in driving engagement with one of said components of said coplanar gear arrangement; an output shaft in driving engagement with a second one of said components of said coplanar gear arrangement; and a coupling mechanism operable to selectively engage a third of said components of said coplanar gear arrangement to one of said input shaft and a housing of said transmission.

Areas of applicability of the present invention will become apparent form the detailed description provided herein. It should be understood that the detailed description and specific examples, while indicating preferred embodiments of the present invention, are intended for purposes of illustration only, since various changes and modifications within the spirit and scope of the invention will become apparent to those skilled in the art from this description.

BRIEF DESCRIPTION OF THE DRAWINGS

The present invention will become more fully understood from the detailed description and the accompanying drawings, wherein.

DETAILED DESCRIPTION OF THE INVENTION

Figure 1:
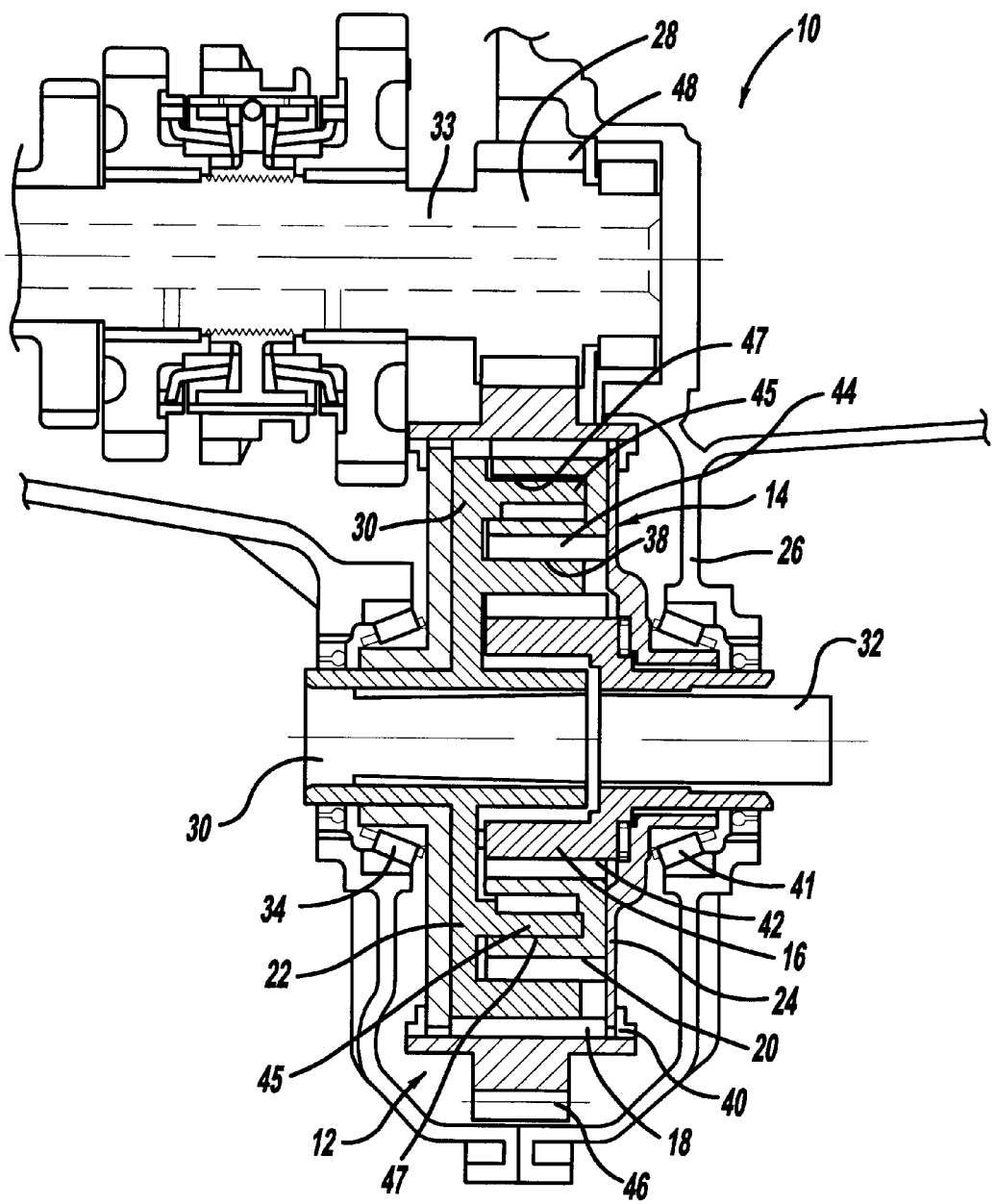
FIG. 1 is a cross-sectional view of a portion of a transaxle including a differential gear mechanism constructed in accordance with the teachings of a first preferred embodiment of the present invention to include a coplanar gear assembly.
Figure 2:
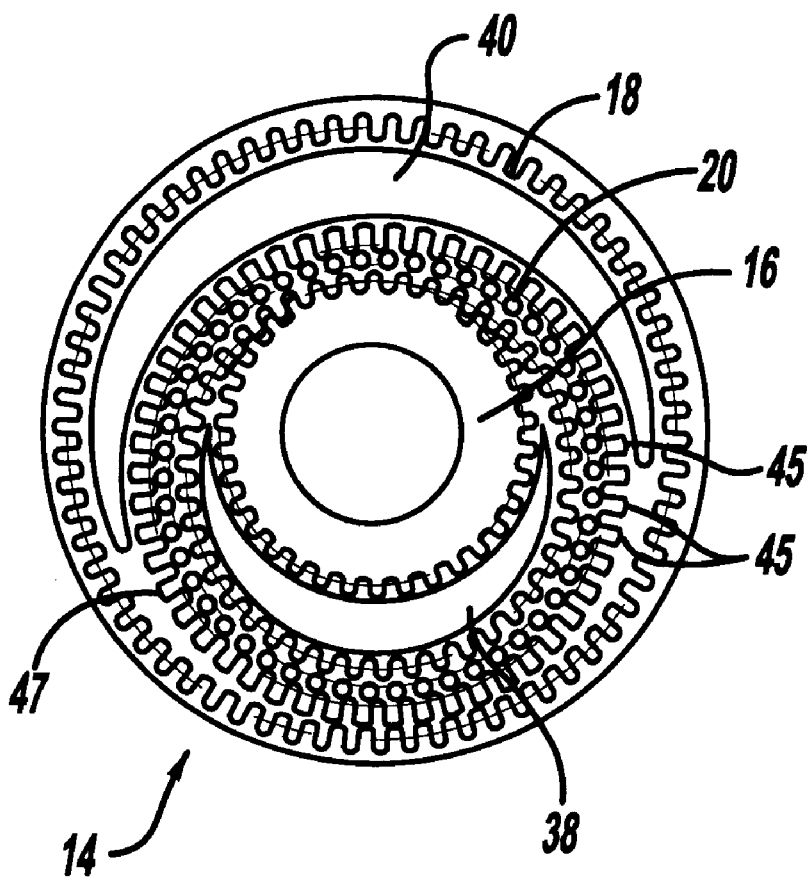
FIG. 2 is an enlarged side view of the coplanar gear assembly of FIG. 1 shown removed from the transaxle for purposes of illustration.

With reference to FIGS. 1 and 2, a portion of a transaxle 10 including a differential gear mechanism 12 constructed in accordance with the teachings of a first preferred embodiment of the present invention is illustrated. Differential gear mechanism 12 is illustrated to include a coplanar gear arrangement 14. As shown particularly in FIG. 2, coplanar gear arrangement 14 generally includes a sun gear 16, an annulus/ring gear 18, a cluster gear 20, a carrier 22, and a carrier housing 24. In addition to differential gear mechanism 12, transaxle 10 is illustrated to generally include a transaxle housing 26, a pinion gear 28, and a pair of axle shafts 30 and 32. Axle shafts 30 and 32 are connected to wheels (not shown) in a conventional manner. Pinion gear 28 is mounted to an output shaft 33 of the transaxle 10. As is known in the art, a plurality of driven gears are disposed on the output shaft 33. It should be understood that the differential 12 can be used with many transaxle designs as well as other types of transmissions without departing from the scope of the present invention.

In the embodiment illustrated, carrier 22 is splined for rotation with the axle shaft 30 and is rotatably supported within transaxle housing 26 with suitable bearings 34. Carrier 22 includes a radially extending portion 36 and first and second axially extending portions 38 and 40. First and second axially extending portions 38 and 40 both have a half-moon shape.

Sun gear 16 is splined for rotation with first axle shaft 32 and rotatably supported within transaxle housing 26 with suitable bearings 41. Sun gear 16 includes external teeth 42 in meshing engagement with internal teeth 44 of cluster gear 20. First axially extending portion 38 of carrier 22 is radially disposed between sun gear 16 and cluster gear 20. In the embodiment illustrated, first axially extending portion 38 surrounds approximately 270 degrees of the perimeter of sun gear 16, thereby limiting the engagement of sun gear 16 with cluster gear 20. Support bearings 45 extend axially from the carrier 22 and are received in a channel 47 defined by the cluster gear 20 and support the cluster gear 20.

Annulus/ring gear 18 includes external teeth 46 in meshing engagement with external teeth 48 of pinion gear 28. Second axially extending portion 40 of carrier 22 is radially disposed between cluster gear 20 and annulus/ring gear 18. In the embodiment illustrated, second axially extending portion 40 similarly surrounds approximately 270 degrees of the perimeter of cluster gear 20.

In the differential gear mechanism 12 described, pinion gear 28 serves as the input which is received by annulus/ring gear 18. Sun gear 16 serves as the output for axle shaft 32. Carrier 22 serves as the output for axle shaft 30. Differential gear mechanism 12 accommodates speed differentials which occur between axle shaft 30 and axle shaft 32, such as during a vehicle turn. The coplanar gear arrangement 14 allows the differential gear mechanism 12 to be packaged smaller than standard bevel gear differentials.

Figure 3:
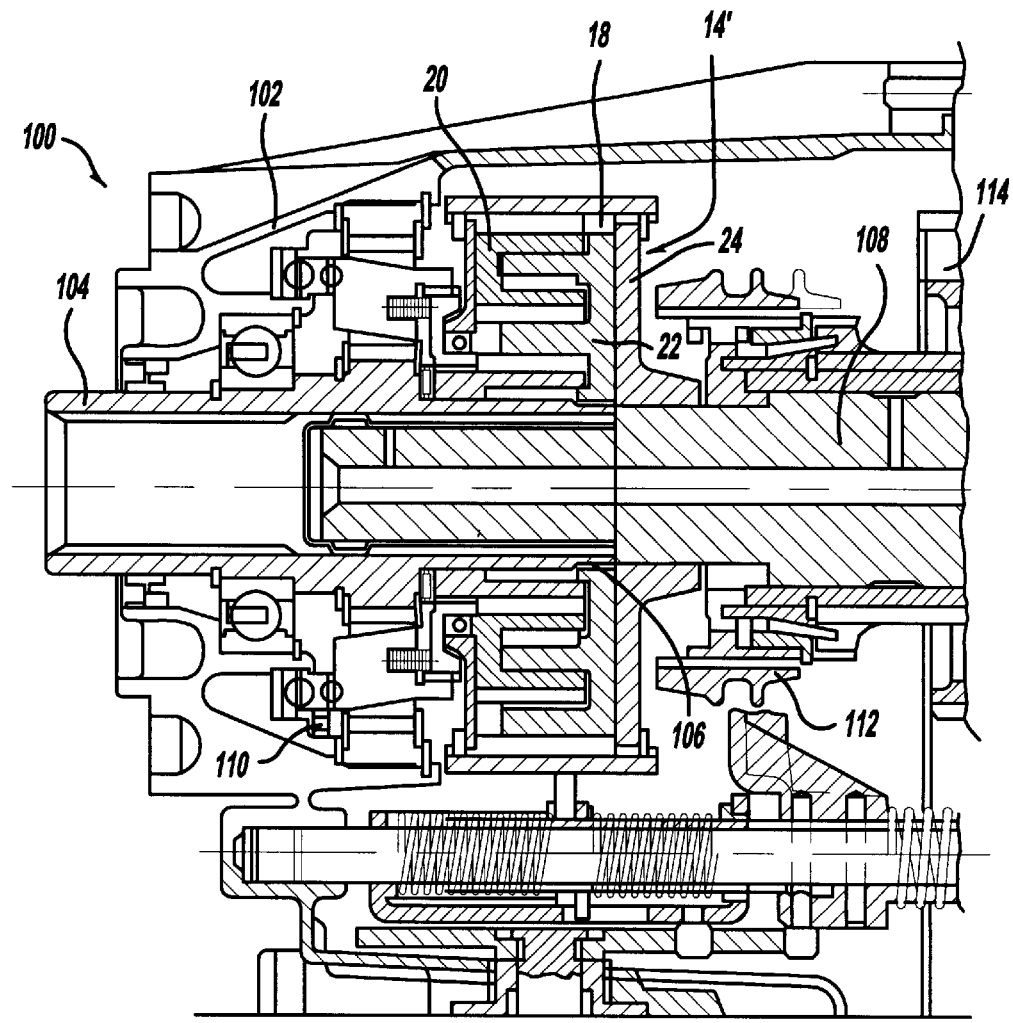
FIG. 3 is a cross-sectional view of a portion of a transfer case constructed in accordance with the teachings of a second preferred embodiment of the present invention to include a coplanar planetary gear assembly.

With reference to FIG. 3, a cross-sectional view of a portion of a transfer case 100 constructed in accordance with the teachings of a second preferred embodiment of the present invention is shown. Transfer case 100 includes a coplanar gear arrangement 14' which is substantially similar in construction to the coplanar gear arrangement 14 discussed above in connection with the first preferred embodiment of the present invention. The transfer case 100 includes a housing 102 which rotatably supports an input shaft 104. Input shaft 104 is connected to carrier 22 through a splined connection 106. The annulus gear 18 is connected to the housing 24 which is in turn connected to an output shaft 108. The sun gear 16 is connectable with either the input shaft 104 or housing 102 via a coupling mechanism 110 (such as a ball ramp coupling mechanism as shown) to effect a high or low operating mode. The transfer case 100 is operable in a two-wheel drive and a four-wheel drive mode by sliding synchronizer sleeve 112 between the "2W" and "4W" positions for engaging and disengaging the drive sprocket 114 with the output shaft 108 for activating four-wheel drive mode, as is known in the art.

Figure 4:
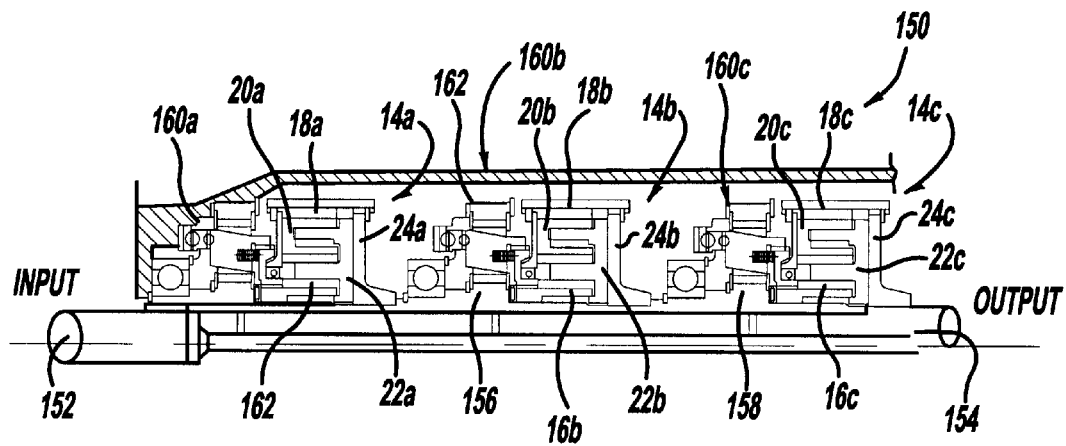
FIG. 4 is a cross-sectional view of a portion of a transmission constructed in accordance with the teachings of a third preferred embodiment of the present invention to include a plurality of coplanar gear assemblies.

With reference to FIG. 4, a cross-sectional view of a portion of a transmission 150 constructed in accordance with the teachings of a third preferred embodiment of the present invention is shown. Transmission 150 includes a plurality of coplanar gear arrangements 14 which are each substantially similar in construction to coplanar gear arrangement 14 discussed above in connection with the first preferred embodiment of the present invention.

Coplanar gear arrangements 14 are operative for selectively coupling an input 152 and an output 154 at one of a plurality of input-to-output ratios. In the exemplary embodiment illustrated, transmission 150 includes three substantially identical coplanar gear arrangements 14a, 14b, 14c. Input shaft 152 is connected to the carrier 22a of the first coplanar gear arrangement 14a. The annulus gear 18a is connected to the housing 24a which is connected to the carrier 22b of the second coplanar gear arrangement 14b via shaft 156. The annulus gear 18b is connected to the housing 24b which is connected to the carrier 22c of the third coplanar gear arrangement 14c via shaft 158. Each of the coplanar gear arrangements 14a–14c is provided with a coupling mechanism 160a–c, respectively (such as a ball ramp as shown or other mechanical clutch device) in order to effect shifts by engaging the sun gears 16a–16c with shafts 152, 156, 158, respectively, or to housing 162. In one application, the highest input to output ratio is 1:1 and the lowest ratio is 1:8.16. It will be understood that ratios smaller than 1:1 may be realized by flipping one or more coplanar gear arrangements 14. Furthermore, various other ratios can be achieved by altering tooth counts.

Figure 5:
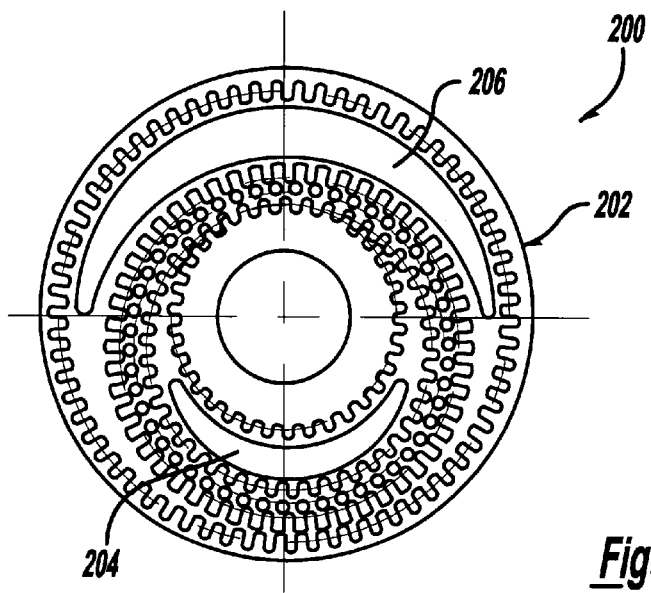
FIG. 5 is a side view of a pumping device which includes a coplanar gear arrangement.

With reference to FIG. 5, a side view of a pumping device 200 constructed in accordance with the teachings of a fourth preferred embodiment of the present invention is shown. Pumping device 200 includes a coplanar gear arrangement 202 which is substantially similar in construction to coplanar gear arrangement 14 discussed above in connection with the first preferred embodiment of the present invention.

Pumping device 200 is intended to function as an alternative for a pump of a hydraulic coupling. Commonly assigned U.S. Ser. No. 08/673,934 (filed Jul. 1, 1996) is directed to a known traction control device having a hydraulic coupling which incorporates a gerotor pump and multi-plate clutch into a common assembly for transferring torque on-demand in response to a speed differential between the driven and non-driven shafts. U.S. Ser. No. 08/673,934 hereby is incorporated by reference as if fully set forth herein. Known hydraulic coupling mechanisms such as the type disclosed in U.S. Ser. No. 08/673,934 have utilized hydraulic pumps which pump fluid in response to relative rotation between two rotating members for purposes of rotatably coupling the two differentially rotating members or shafts. These systems generally include a hydraulic pump coupled to the two differentially rotating shafts, which in turn controls a hydraulically actuated piston. The piston in turn acts on a clutch assembly coupling the two rotating shafts. The hydraulic pump provides volumetric flow of fluid that varies in direct proportion to the relative or differential rotational speeds of the rotating shafts. Generally, the hydraulic piston is equipped with an outlet orifice that restricts the outflow of fluid from the piston in order to generate a back pressure of fluid, which drives the piston to engage the clutch mechanism. Such systems therefore provide a capacity for torque transfer between the rotating members that varies in direct proportion to the relative or differential speed between the two shafts.

In operation of pumping device 202, hydraulic fluid is allowed to be pumped into a first cavity 204 through gear teeth meshes and out a second cavity 206.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A differential gear mechanism driven by a pinion gear and operable to permit relative rotation between a first axle shaft and a second axle shaft, the differential gear mechanism comprising:

a sun gear adapted to be splined for rotation with the first axle shaft;

an annulus/ring gear including external teeth adapted to meshingly engage teeth of the pinion gear;

a cluster gear including external teeth in meshing engagement with internal teeth of said annulus/ring gear and internal teeth in meshing engagement with said sun gear; and a carrier supporting said cluster gear and adapted to be splined for rotation with the second axle shaft.

2. The differential gear mechanism according to claim 1, wherein said carrier includes first and second axially extending portions, said first axially extending portion radially disposed between said sun gear and said cluster gear, said second axially extending portion radially disposed between said annulus/ring gear and said cluster gear.

* * * * *